(12) United States Patent
Chang

(10) Patent No.: US 6,939,025 B2
(45) Date of Patent: Sep. 6, 2005

(54) LIGHT CONSOLIDATING SYSTEM

(75) Inventor: Sean Chang, Taoyuan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 101 days.

(21) Appl. No.: 10/456,532

(22) Filed: Jun. 9, 2003

(65) Prior Publication Data

US 2004/0070979 A1 Apr. 15, 2004

(30) Foreign Application Priority Data

Oct. 11, 2002 (TW) .......................... 91123415 A

(51) Int. Cl.⁷ .......................... F21V 7/00; G02B 27/14
(52) U.S. Cl. .................... 362/299; 362/302; 359/629
(58) Field of Search .................... 362/297–298, 362/343, 346, 347, 299, 302; 353/98, 99, 81; 359/629

(56) References Cited

U.S. PATENT DOCUMENTS 5,765,934 A * 6/1998 Okamori et al. ............. 353/94
2002/0030795 A1 * 3/2002 Yamamoto .................. 353/94

* cited by examiner

Primary Examiner—Ali Alavi
(74) Attorney, Agent, or Firm—Birch, Stewart, Kolasch & Birch, LLP

(57) ABSTRACT

A light consolidating system is provided for converging light emitted from at least one lamp positioned at the focus of an ellipse. A light guiding means is provided in the system for guiding the converged light to the output side. The system is characterized by the focusing feature of the ellipse lamps and therefore increases the efficiency of consolidating light.

18 Claims, 7 Drawing Sheets

LIGHT CONSOLIDATING SYSTEM

FIELD OF THE INVENTION

The invention relates to a light consolidating system, and more particularly, to a light consolidating system with multiple lamps for projectors.

BACKGROUND OF THE INVENTION

Projection techniques known today can mainly be grouped in two types: Liquid Crystal Display (LCD) projectors and Digital Light Processing (DLP) projectors. The DLP projector was developed by Texas Instrument Co. The DLP technology adopts a very small mirror installed on a micro chip called a Digital Micromirror Device (DMD) to reflect light and generate highly bright and sharp projection images. Nevertheless, projectors adopting LCD or DLP usually use one single lamp as the light source to project images. To obtain higher lumens for the projector, one common approach is to use a higher power lamp. Another approach is to apply optical principles to consolidate light to achieve a greater output power so that higher lumen output is obtained to project the images.

However, lamps of a greater power usually have a shorter service life, a lower illumination efficiency and greater electric power consumption. The cost of parts also increases. Hence it is not a desirable choice.

Besides adopting lamps of a greater power, there are techniques that employ optical principles to consolidate light of lower power lamps to output light beams of a greater power. FIG. 1 illustrates one such example. It has a first paraboloids mirror 11 with a first lamp 21 located on the focus thereof and a second paraboloids mirror 12 with a second lamp 22 located on the focus thereof. According to Snell's Law, light 21A emitted from the first lamp 21 is reflected on the first paraboloids mirror 11 and projected to the second parabolids mirror 12, then is reflected to a light tunnel 40 through a rectangular prism 30. Similarly, light 22B emitted from the second lamp 22 is reflected on the first paraboloids mirror 11 and projects directly to a rectangular prism 30, which reflects the light to the light tunnel 40. Similarly, light 22A and 22B emitted from the second paraboloids mirror 12 travels in the same path to the light tunnel 40. The rectangular prism 30 allows light from the first lamp 21 and the second lamp 22 to enter the light tunnel 40 and combine the energy of the first lamp 21 and the second lamp 22.

The light consolidating system shown in FIG. 1 utilizes the feature of the paraboloids mirror and rectangular prism. The efficiency of light consolidation is between 1.3 and 1.4. There is still room for improvement in terms of energy loss of the lamps. In addition, producing the paraboloids mirrors involves a non-spherical fabrication technique, which is quite difficult. The errors of the paraboloids mirror and the rectangular prism also make output of parallel light beams difficult to achieve. As a result, the efficiency of light consolidation decreases.

Therefore, it is necessary to develop a light consolidation system that uses more than one lamp of a relatively lower power and adopts optical principles to achieve an equal amount of output lumens to increase light consolidation efficiency and remedy the problems of high power consumption and low illuminating efficiency that occur with the conventional techniques.

SUMMARY OF THE INVENTION

In view of the aforesaid disadvantages, the primary object of the invention is to provide a light consolidating system that employs light consolidating principles and more than one lamp to increase output power and provide greater lumens for projectors.

Another object of the invention is to provide an efficient light consolidating system that employs an ellipsoidal mirror as the reflection mirror for light. The dual focuses feature of the ellipse allows the lamp located on the first focus to be reflected on the ellipsoidal mirror and converged on the second focus to reduce energy loss after reflection and increase the efficiency of light consolidation.

According to the first embodiment of the invention, the light consolidating system includes a lamp located on a focus of an ellipse and a light guiding means located on the cross spot of the long axis and the short axis of the ellipse. Then light emitted from the lamp may be converged and output on one side, which is extended from the short axis of the ellipse.

The aforesaid lamp further includes a first lamp shade formed in an ellipsoidal surface with the lamp located on a first focus to converge the light emitted from the lamp to the light guiding means. In addition, a second lamp shade is provided that also is formed in an ellipsoidal surface and is located opposite to the first lamp shade to converge the emitted lamp light to the first focus of the second lamp shade. Through the focusing feature of the first lamp shade and the second lamp shade, loss occurring during light transmission may be reduced and efficiency of light consolidation may increase. The light guiding means, which may be a prism, further includes a beam splitter and a reflector.

According to a second embodiment of the invention, the light consolidating system includes two lamps respectively located on the two focus of an ellipse and a light guiding means located on the cross spot of the long axis and the short axis of the ellipse. Light emitted from the lamps may be converged and outputted to one side extending from the short axis of the ellipse.

The aforesaid lamp further includes a lamp shade that is formed in an ellipsoidal surface to converge light emitted from the lamp to the light guiding means. Through the focusing feature of the lamp shade, loss occurring during light transmission may be reduced and efficiency of light consolidation may increase. The light guiding means, which may be a prism, further includes a beam splitter and a reflector.

The foregoing, as well as additional objects, features and advantages of the invention will be more readily apparent from the following detailed description, which proceeds with reference to the accompanying drawings.

DESCRIPTION OF THE PREFERRED EMBODIMENTS

In order to facilitate understanding, in the following description the lamp will be represented by an ellipsoidal shade. In fact, any lamp that can converge light to a focal point may be used as the lamp in the invention.

Figure 1:
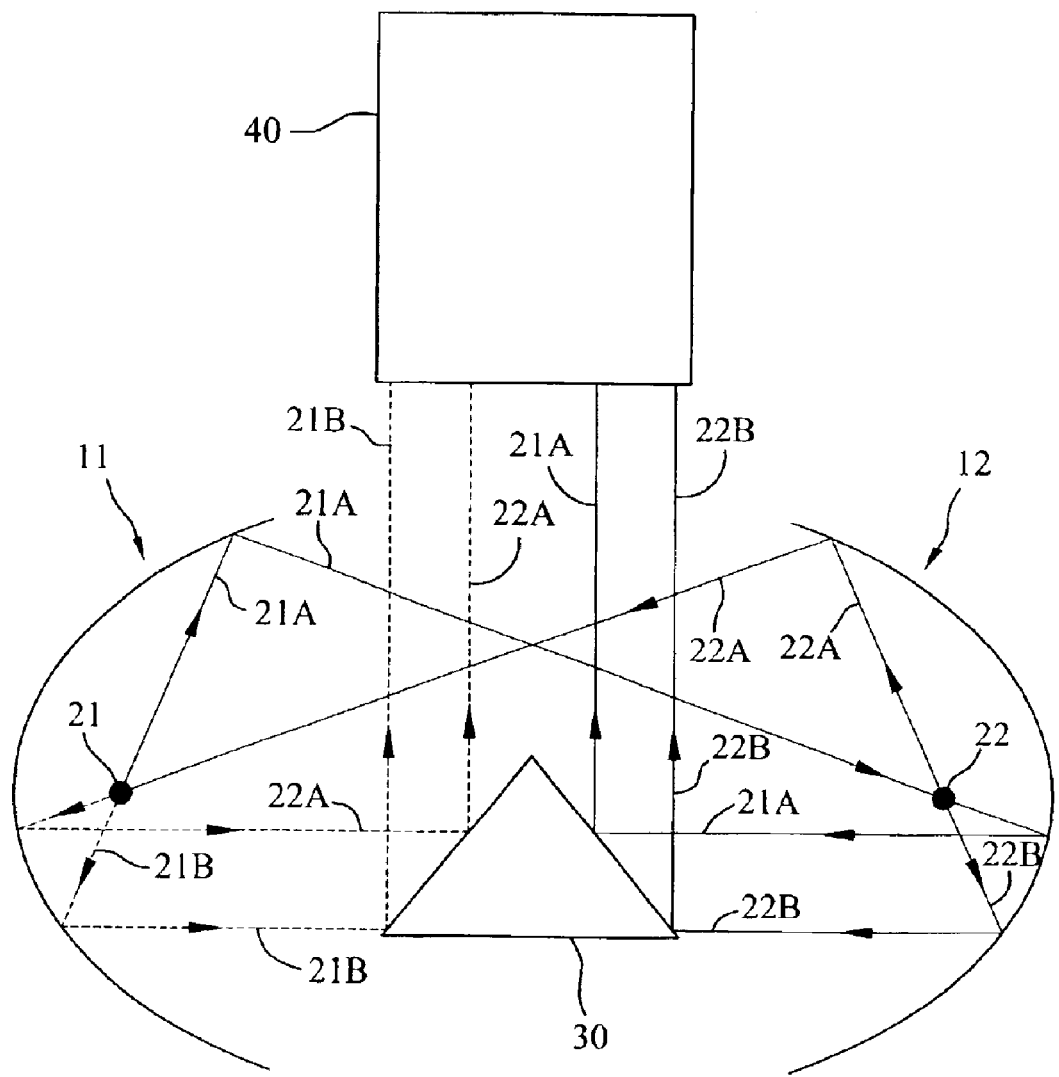
FIG. 1 is a schematic view of a conventional light consolidation system.
Figure 2:
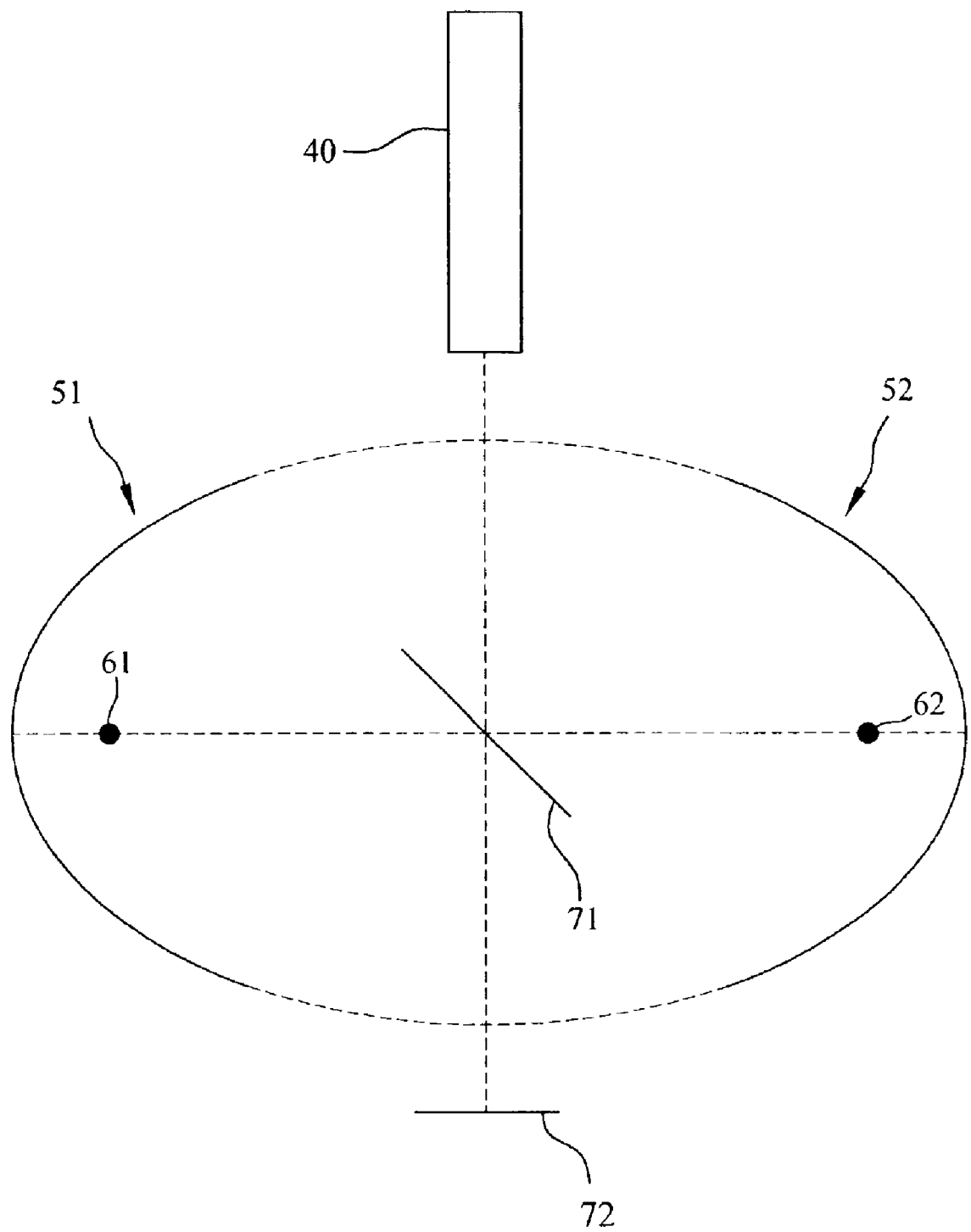
FIG. 2 is a schematic view of a light consolidation system according to the first embodiment of the invention.

Refer to FIG. 2 of a light consolidating system according to the first embodiment of the invention. The light consolidating system composed of two lamps includes a first ellipsoidal mirror 51, a second ellipsoidal mirror 52, a first lamp 61, a second lamp 62, a beam splitter 71, a reflector 72 and a light tunnel 40. The first ellipsoidal mirror 51 and the second ellipsoidal mirror 52 respectively have an inner side plated with a full reflection film to reflect light projected on the first ellipsoidal mirror 51 and the second ellipsoidal mirror 52. The first ellipsoidal mirror 51 and the second ellipsoidal mirror 52 function as the respective lamp shade of the first lamp 61 and the second lamp 62. The beam splitter 71 and the reflection mirror 72 serve as light guiding means to guide light emitted from the first lamp 61 and the second lamp 62 to an output side for output.

The light consolidating system of the invention employs ellipsoidal mirrors rather than paraboloids mirrors, as used in the conventional techniques. This is because conventional light consolidating systems have the lamp located on the focus of the paraboloids mirror to generate parallel light after being reflected by the paraboloids mirror, and the parallel light is reflected by a rectangular prism to form a parallel light beam for output. However, the light is usually reflected many times before being outputted. The errors of the paraboloids mirror and the prism make output of the parallel light beam difficult to achieve.

The ellipse has two focuses, i.e. a first focus and a second focus. In a completed ellipse plated with a full reflection film, light emitted from the first focus is reflected on the reflection film and converged on the second focus. Similarly, light emitted from the second focus is converged on the first focus. Hence, the incident angle for guiding the converged light to the light tunnel is easier to control, a greater range of error is allowable and the flexibility is greater.

The light consolidating system of the invention employs the feature of the focus of the ellipse. The first lamp 61 is located on the first focus of the first ellipsoidal mirror 51 and the second lamp 62 is located on the first focus of the second ellipsoidal mirror 52. The positions of the first ellipsoidal mirror 51 and the second ellipsoidal mirror 52 form an ellipse, so the first focus of the first ellipsoidal mirror 51 and the second focus of the second ellipsoidal mirror 52 coincide, and the second focus of the first ellipsoidal mirror 51 and the first focus of the second ellipsoidal mirror 52 also coincide.

The light tunnel 40 and the reflector 72 are located respectively on two sides of the extension of the short axis of the ellipse formed by the first ellipsoidal mirror 51 and the second ellipsoidal mirror 52. The light tunnel guides the light that has been consolidated to the next optical system. The light tunnel 40 may be viewed as an element required in the system. It may also be a focusing prism for converging light to a focus.

The beam splitter 71 is located on a cross spot of the long axis and the short axis of the ellipse plane formed by the first ellipsoidal mirror 51 and the second ellipsoidal mirror 52 to reflect the light projected from the first focus and the second focus. The light that penetrates the beam splitter 71 without being reflected is reflected by the ellipsoidal mirrors 51, 52 and guided into the light tunnel 40 through the beam splitter 71. The reflector 72 is used to reflect the scattering light to the beam splitter 71 again so as to reduce the loss of light.

Figure 3:
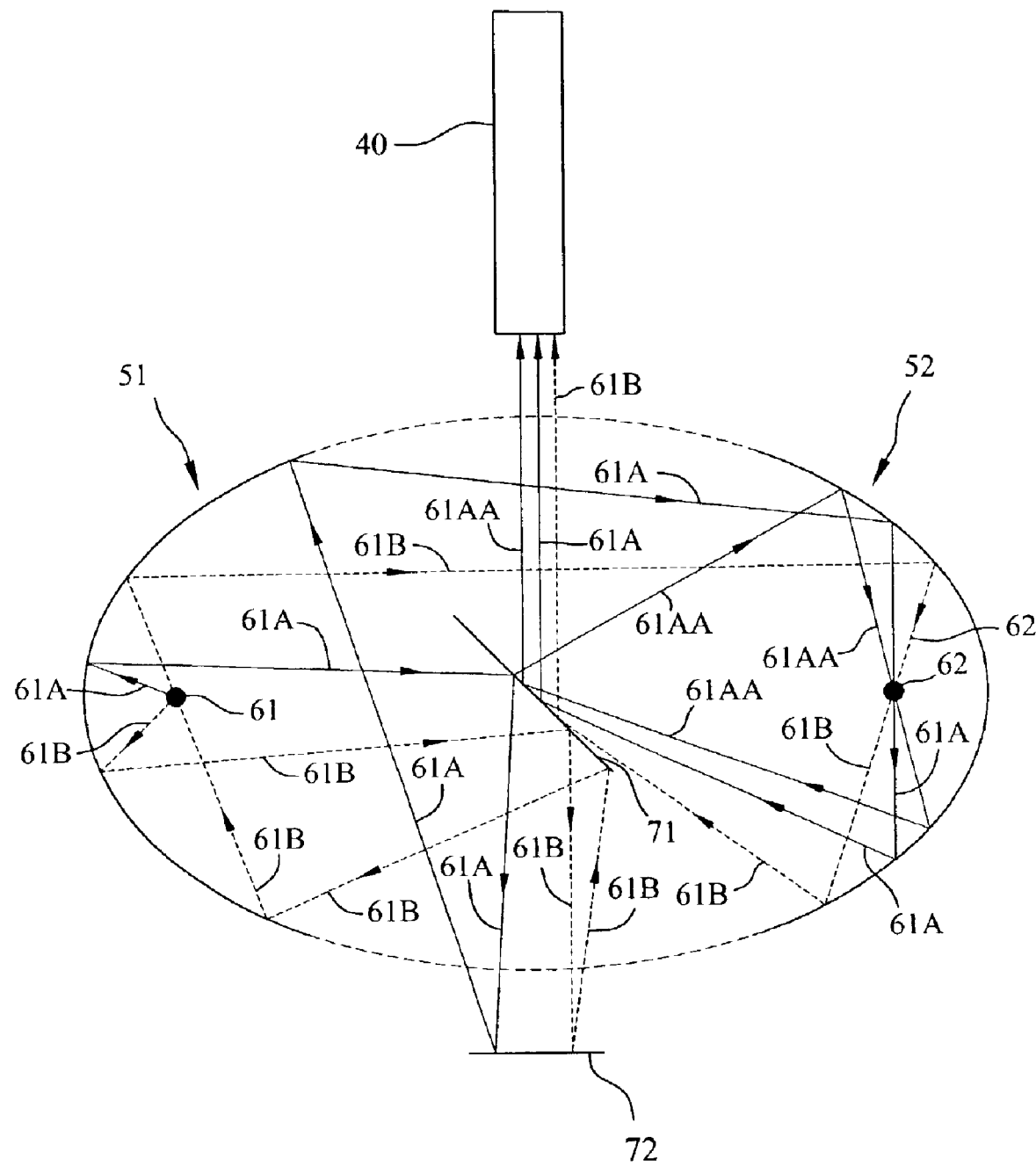
FIG. 3 is a schematic view of the light consolidation system depicted in FIG. 2, showing the light converging process for light emitted from the first lamp.

Refer to FIG. 3 for the light converging process of the first lamp 61. Light 61A emitted from the first lamp 61, according to Snell's Law, is reflected by the first ellipsoidal mirror 51 and projected to the beam splitter 71. The light 61A is finally guided into the light tunnel 40 through light reflection paths from the beam splitter 71, the reflector, the first ellipsoidal mirror 51, the second ellipsoidal mirror 52, and the splitter 71 to the light tunnel 40. However, the light 61 A is not completely reflected by the beam splitter 71. A portion of the light 61 A passes through the beam splitter 71 to become light 61AA as shown in FIG. 3.

The path of the light 61AA also follows Snell's Law. The light 61AA is reflected by the second ellipsoidal mirror 52, and reflected by the beam splitter 71 into the light tunnel 40. The first lamp 61 further emits another light 61B, which is reflected by the beam splitter 71 and the reflector 72 and projected onto the second ellipsoidal mirror 52. It is then reflected into the light tunnel 40 through the second ellipsoidal mirror 52 and the beam splitter 71. The paths of the light beams 61A, 61AA and 61B indicate that by means of the beam splitter 71, light emitted from the first lamp 61 may be converged into the light tunnel 40 whether it is reflected by the first ellipsoidal mirror 51 or the second ellipsoidal mirror 52.

Figure 4:
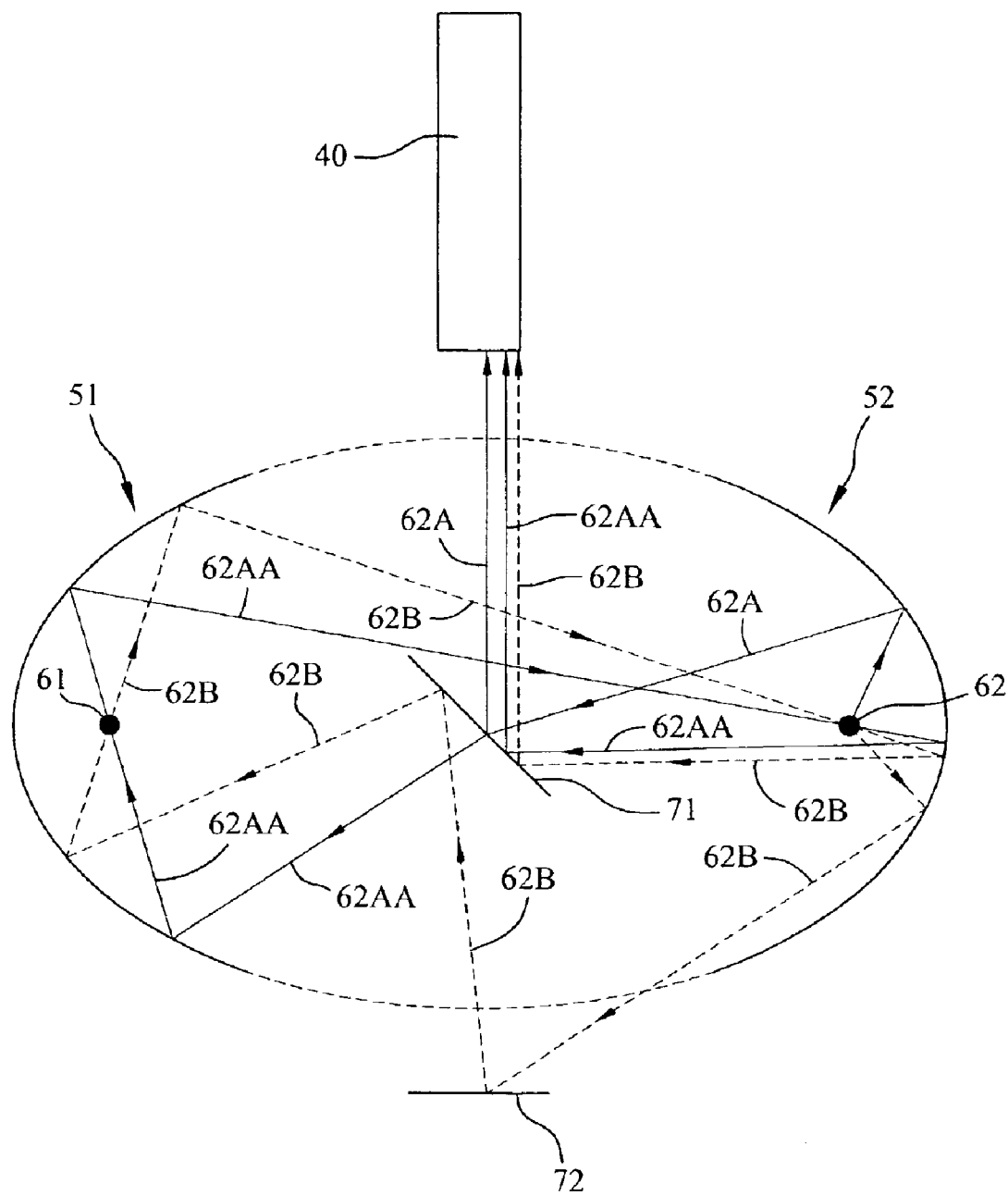
FIG. 4 is a schematic view of the light consolidation system depicted in FIG. 2, showing the light converging process for light emitted from the second lamp.

Refer to FIG. 4 for the light converging process of the second lamp 62. Light 62A emitted from the second lamp 62, according to Snell's Law, is reflected on the second ellipsoidal mirror 52 and projected onto the beam splitter 71, which reflects the light into the light tunnel 40. A portion of the light 62A passes through the beam splitter 71 to become light 62AA. Similarly, according to Snell's Law, the light 62AA is reflected by the first ellipsoidal mirror 51, and reflected by the beam splitter 71 into the light tunnel 40. The second lamp 62 emits another light 62B, which is reflected by the second ellipsoidal mirror 52, projected onto the reflector 72, reflected to the beam splitter 71, and then reflected by the first ellipsoidal mirror 51. It travels the same path as the light 62AA, and finally enters into the light tunnel 40. Based on the previous discussion, by means of the beam splitter 71, lights emitted from the second lamp 62 may be converged into the light tunnel 40 whether they are reflected by the first ellipsoidal mirror 51 or the second ellipsoidal mirror 52. Finally, through the reflector 72, scattered light may be reflected to the first ellipsoidal mirror 51 and the second ellipsoidal mirror 52 to reduce the loss of reflection.

Hence, any light from the first lamp 61 or the second lamp 62 is fully reflected by the first ellipsoidal mirror 51 and the second ellipsoidal mirror 52, past through the beam splitter 71, and finally converged by the beam splitter 71. Therefore, light energy from two different lamps is reflected and accumulated to become light of greater power.

The light consolidating system of the invention may use only one lamp rather than two lamps at the same time. Through the feature of the focus of the first ellipsoidal mirror and the second ellipsoidal mirror, efficiency of light consolidating may be increased. The beam splitter may be plated with a splitting grid (not shown in the drawings) on the light output side close to the second ellipsoidal mirror to separate the light to red light, green light and white light before entering into the light tunnel.

Figure 5:
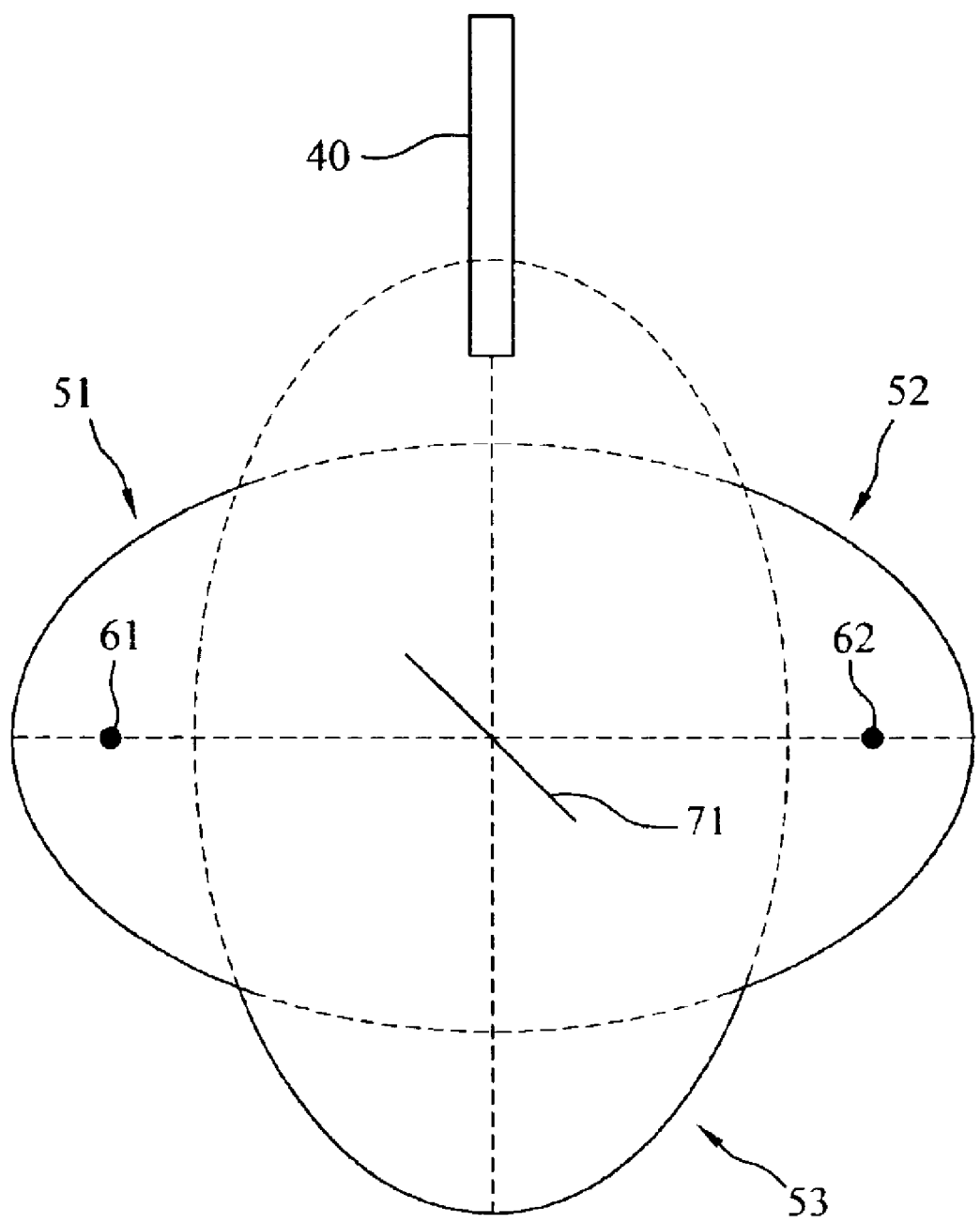
FIG. 5 is a schematic view of an embodiment of a light guiding means of the light consolidation system of the invention.

The structure of the beam splitter 71 and the reflection mirror 72 of the light guiding means is shown in FIG. 2. In addition, the reflection mirror 72 may also be an ellipsoidal mirror as shown in FIG. 5. A third ellipsoidal mirror 53 is employed to focus the light that is reflected from the beam splitter 71 and reflect it back to the beam splitter 71 and the first or the second ellipsoidal mirrors 51 or 52 to reduce the loss of light.

Figure 6:
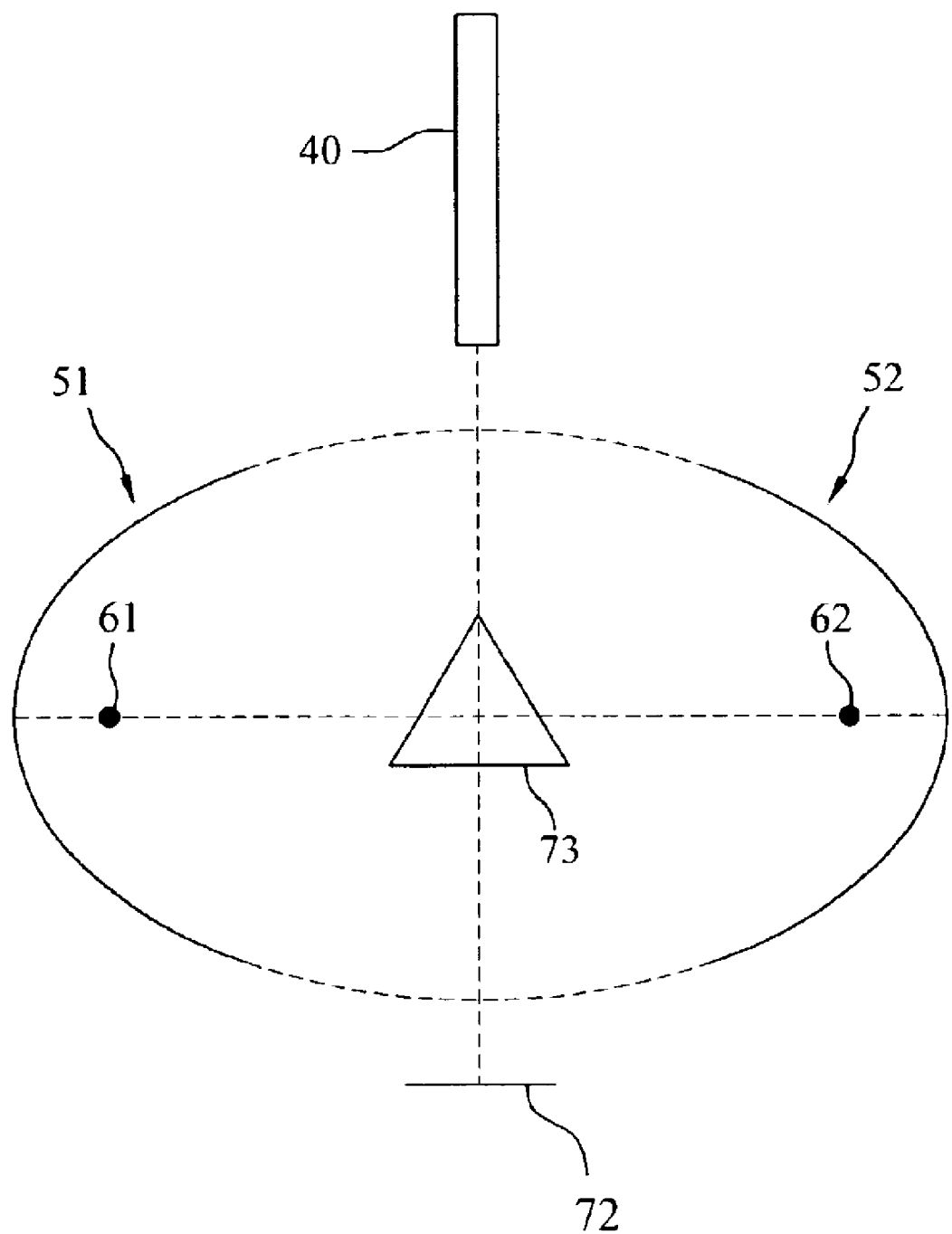
FIG. 6 is a schematic view of another embodiment of a light guiding means of the light consolidation system of the invention.

Furthermore, the light guiding means may also adopt a prism 73 as shown in FIG. 6. The prism 73 is positioned at the cross spot of the long axis and the short axis of the ellipse for converging the light emitted from the first lamp 61 and the second lamp 62 through the focusing feature of the first ellipsoidal mirrors 51 and the second ellipsoidal mirrors 52.

Figure 7:
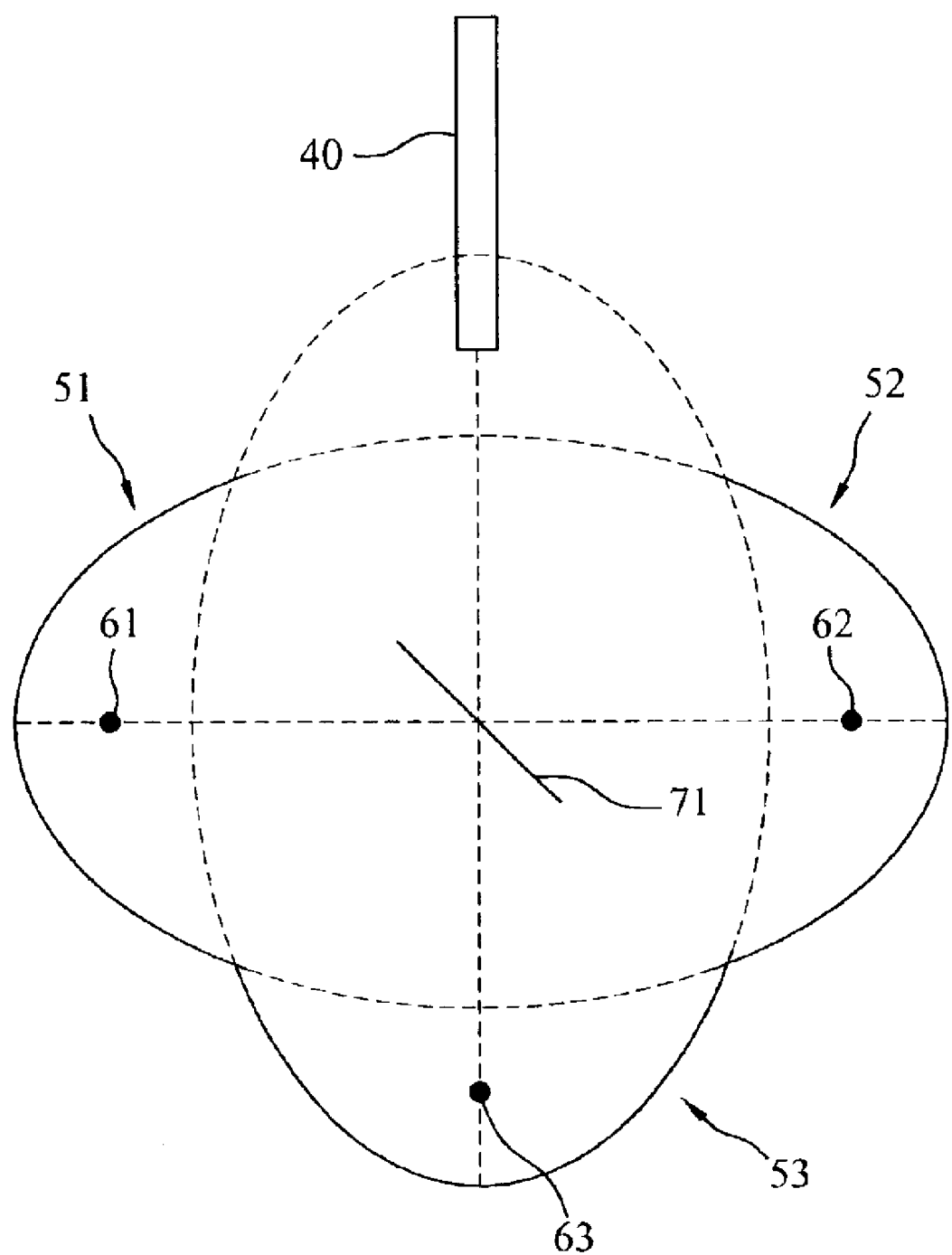
FIG. 7 is a schematic view of a light consolidation system according to the second embodiment of the invention.

Refer to FIG. 7 of a light consolidating system according to the second embodiment of the invention. The light consolidating system composed of three lamps includes a first ellipsoidal mirror 51, a second ellipsoidal mirror 52, a third ellipsoidal mirror 53, a first lamp 61, a second lamp 62, a third lamp 63, a beam splitter 71, and a light tunnel 40. The first ellipsoidal mirror 51, the second ellipsoidal mirror 52 and the third ellipsoidal mirror 53 have an inner side plated with a full reflection film to reflect light projected onto the first ellipsoidal mirror 51, the second ellipsoidal mirror 52 and the third ellipsoidal mirror 53.

The light consolidating system in the second embodiment also employs the feature of the focus of the ellipse. The first lamp 61 is located on the first focus of the first ellipsoidal mirror 51, and the second lamp 62 is located on the first focus of the second ellipsoidal mirror 52. The positions of the first ellipsoidal mirror 51 and the second ellipsoidal mirror 52 form an ellipse. Therefore the first focus of the first ellipsoidal mirror 51 and the second focus of the second ellipsoidal mirror 52 coincide, and the second focus of the first ellipsoidal mirror 51 and the first focus of the second ellipsoidal mirror 52 coincide.

The third lamp 63 is located on the first focus of the third ellipsoidal mirror 53. The short axis of the ellipse formed by the first ellipsoidal mirror 51 and the second ellipsoidal mirror 52 and the long axis of the ellipse of the third ellipsoidal mirror coincide.

The light tunnel 40 is located on the second focus of the third ellipsoidal mirror 53 for guiding the consolidated light to the next optical system. The light tunnel 40 may be viewed as an element required in the system. It may also be a prism.

The beam splitter 71 is located on a cross spot of the long axis and the short axis of the ellipse plane formed by the first ellipsoidal mirror 51 and the second ellipsoidal mirror 52 to reflect the light projected from the first focus and the second focus. The light that penetrates the beam splitter 71 without being reflected is reflected by the ellipsoidal mirrors and guided into the light tunnel 40 through the beam splitter 74.

The paths and converging process of the light emitted from the first lamp 61 and the second lamp 62 are similar to the first embodiment set forth above. Light emitted from the third lamp 63 is reflected by the third ellipsoidal mirror 53 and is converged into the light tunnel 40 through the beam splitter 71, as in the first embodiment.

The light consolidating system disclosed above may use only one or two lamps rather than three lamps at the same time. Through the feature of the focus of the ellipsoidal mirror, efficiency of light consolidating may be increased. Similarly, the beam splitter may be plated with a splitting grid (not shown in the drawings) on one side close to the second ellipsoidal mirror to separate the light into red light, green light and white light before entering the light tunnel.

The light consolidating system of the invention utilizes lamps with lower lumens and through optical reflection principles accumulates power of lamps of different lumens to achieve a greater power output. However, in practice, only one lamp may be turned on at a time. A power detection circuit and a switch circuit may be designed and installed on each lamp. When one of the lamps approaches the end of its service life, another lamp may be switched automatically to replace it. A manual switch method may also be adopted to enable users to select different desired lamps. Two sets of lamps may also have different output lumens to meet different requirements. By switching the lamps, total service life becomes longer.

In summary, the light consolidating system of the invention employs the dual focuses feature of an ellipse to enable light to converge on another focus whether it is emitted from a first focus or a second focus. It guides the light through a light guiding means to a light output side to output. The efficiency of light consolidation of the invention can reach at least 1.5, which is significantly higher than conventional techniques.

In addition, the structure of the invention uses fewer light tunnels than the conventional techniques, is simpler and easier to fabricate, and also reduces the cost of parts and modules.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A light consolidating system, comprising:
   a first lamp located on a first focus of an ellipse; and
   a light guiding means located on a cross spot of the long axis and the short axis of the ellipse for converging lights emitted from the first lamp to one side extending from the short axis of the ellipse for outputting.

2. The light consolidating system of claim 1, wherein the first lamp comprises a first shade for converging the lights generated by the first lamp to the light guiding means.

3. The light consolidating system of claim 2, wherein the first shade forms a first ellipsoidal surface on the ellipse, the first lamp being located on the first focus of the first ellipsoidal surface.

4. The light consolidating system of claim 1 further comprising a second shade located on a position opposite to the first shade.

5. The light consolidating system of claim 4, wherein the second shade forms a second ellipsoidal surface on the ellipse such that lights emitted from the first lamp being converged to a second focus of the second ellipsoidal surface.

6. The light consolidating system of claim 5 further comprising a second lamp located on the second focus of the second ellipsoidal surface, the second shade converging lights emitted from the second lamp to the first focus of the first shade.

7. The light consolidating system of claim 1, wherein the light guiding means comprises:
   a beam splitter located on the center of the ellipse; and
   a reflector located on the other side extending from the short axis of the ellipse.

8. The light consolidating system of claim 7, wherein the reflector is a plane mirror.

9. The light consolidating system of claim 7, wherein the reflector is an ellipsoidal mirror.

10. The light consolidating system of claim 1, wherein the light guiding means is a prism.

11. A light consolidating system, comprising:

two lamps located on two focuses of an ellipse; and a light guiding means located on a cross spot of the long axis and the short axis of the ellipse for converging lights emitted from the two lamps to one side extending from the short axis of the ellipse for outputting.

12. The light consolidating system of claim 11, wherein each of the two lamps respectively comprises a shade for converging the lights generated by the corresponding lamp to the light guiding means.

13. The light consolidating system of claim 12, wherein the two shades form a first ellipsoidal surface and a second ellipsoidal surface, respectively, and the two lamps are located on a first focus of the first ellipsoidal surface and a second focus of the second ellipsoidal surface, respectively.

14. The light consolidating system of claim 11, wherein the light guiding means comprises:

a beam splitter located on the center of the ellipse; and a reflector located on the other side extending from the short axis of the ellipse.

15. The light consolidating system of claim 14, wherein the reflector is a plane mirror.

16. The light consolidating system of claim 14, wherein the reflector is an ellipsoidal mirror.

17. The light consolidating system of claim 16, wherein the ellipsoidal mirror further comprises a lamp located on a third focus of the ellipsoidal mirror.

18. The light consolidating system of claim 11, wherein the light guiding means is a prism.

* * * * *